No. 802,421. PATENTED OCT. 24, 1905.
J. S. STONE.
SPACE TELEGRAPHY.
APPLICATION FILED MAR. 31, 1905.

WITNESSES
Brainerd J. Judkins
Georgia A. Higgins

INVENTOR
John Stone Stone
by Alex. P. Browne
attorney

UNITED STATES PATENT OFFICE.

JOHN STONE STONE, OF CAMBRIDGE, MASSACHUSETTS, ASSIGNOR TO WILLIAM W. SWAN, TRUSTEE, OF BOSTON, MASSACHUSETTS.

SPACE TELEGRAPHY.

No. 802,421.  Specification of Letters Patent.  Patented Oct. 24, 1905.

Application filed March 31, 1905. Serial No. 253,021.

*To all whom it may concern:*

Be it known that I, JOHN STONE STONE, a citizen of the United States, and a resident of Cambridge, in the county of Middlesex and State of Massachusetts, have invented a certain new and useful Improvement in Space Telegraphy, of which the following is a specification.

This invention relates to the art of transmitting intelligence from one station to another by means of electromagnetic waves without the use of wires to guide the waves to their destination; and it relates more particularly to systems for receiving signals transmitted by such waves.

In those space telegraph receiving systems which consist of an elevated receiving conductor conductively connected to two parallel branches one containing a condenser and the other containing a coil, the two branch circuits together forming a closed circuit containing a condenser and a coil, it has heretofore been attempted to attune the elevated conductor and the closed circuit each to the frequency of the waves the energy of which is to be received, on the supposition that the natural period of the system so formed would be equal to that of either of its component circuits when isolated. In the absence of a careful and accurate consideration of the subject it might be held that the elevated conductor *per se* is the equivalent of a lumped capacity in series with a lumped inductance and that because the product of capacity by inductance of the closed circuit is equal to the product of capacity by inductance of the open circuit, the product of the resultant capacity of the system by the resultant inductance of the system is equal to the products of the corresponding electromagnetic constants of either circuit when isolated, the fallacy residing in the supposition that the inductances of the two circuits, the one a lumped inductance and the other a distributed inductance, may be added like two lumped inductances and that the electrostatic capacities of the two circuits, the one a lumped capacity and the other a distributed capacity, may be compounded like two lumped capacities; and it might therefore be maintained that the system is one of a single degree of freedom. Thus if $C_1 L_1$ represent the capacity and inductance of the elevated conductor and $C_2 L_2$ the capacity and inductance of the closed circuit, it might be maintained that the natural period of the system formed by conductively connecting the elevated conductor with the closed circuit will depend upon the factors $$\frac{C_1 C_2}{C_1 + C_2}(L_1 + L_2) = C_1 L_1 = C_2 L_2,$$

just as in the case of the serial conductive connection of two circuits, the one containing a condenser of capacity $C_1$ and a coil of inductance $L_1$ and the other containing a condenser of capacity $C_2$ and a coil of inductance $L_2$. That such is not the case and that a system so constituted is one having a plurality of degrees of freedom I have pointed out in my Letters Patent No. 767,994, while in my Letters Patent Nos. 767,971, 767,989 and 767,990, in the art of wireless telegraphy, and in my Letters Patent Nos. 717,467 and 717,515, in the art of wire telegraphy, I have disclosed means whereby a receiving circuit made resonant to a definite predetermined frequency by lumped capacity and lumped inductance may be conductively connected with an elevated receiving conductor or with a line wire and yet vibrate as a simple circuit, being in such case the equivalent of a circuit having but a single degree of freedom and responding to substantially the same frequency to which it responded when isolated.

The objects of the present invention are to provide a space telegraph receiving system in which a closed parallel branch circuit containing capacity in one branch and inductance in the other is conductively connected with the elevated receiving conductor and is so designed as to balance by its reactance for a persistent train of simple harmonic electrical oscillations of definite, predetermined frequency the reactance of the receiving conductor *per se;* and to prevent the response of a conductively connected tuned or resonant receiving circuit to electrical impulses of a frequency to which such circuit is not attuned or too abrupt or impulsive electrical forces.

The invention may be best understood by having reference to the drawings which accompany and form a part of this specification and which illustrate diagrammatically various embodiments of my invention.

In the drawings,

Figs. 2 and 3 are reproductions of Figs. 9 and 11 respectively of my Letters Patent No. 767,994 and represent space telegraph receiving systems.

Figures 4, 5:
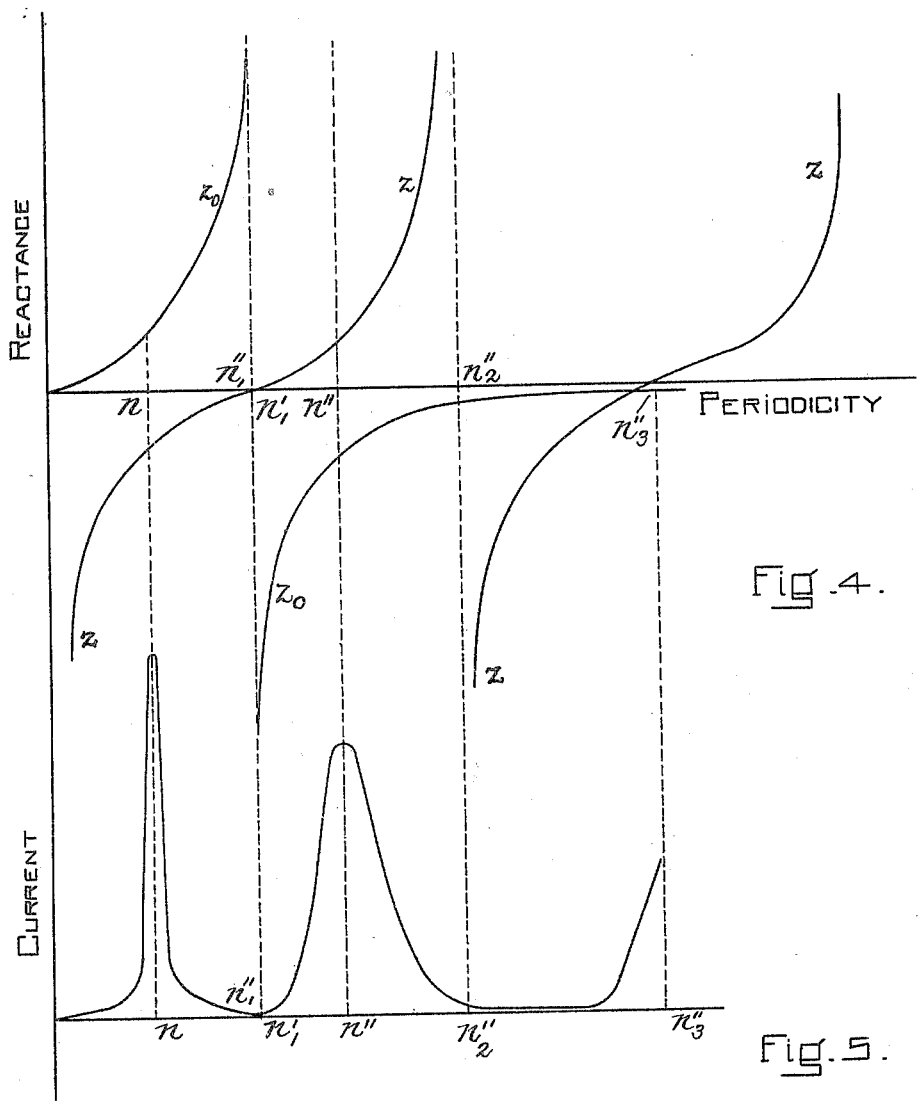

Figs. 4 and 5 are diagrams hereinafter more fully described.

In the figures,

V is an elevated receiving conductor.

E is an earth connection.

C $C_1$ $C'_1$ $C''$ are condensers.

L L' $L'_1$ are inductances.

K is a wave detector herein shown as a coherer.

K' is a wave detector herein shown as a bolometer fine wire or strip.

T is a signal indicating device which may be a telephone receiver.

R is a resistance.

B is a battery.

Referring to Fig. 4, which is a curve drawn to rectangular co-ordinates in which the ordinates represent reactance and the abscissae represent periodicity, Z is a curve showing the variation with frequency of the reactance at the center of the elevated conductor *per se;* and $Z_0$ is a curve showing the variation with frequency of the reactance presented by a parallel branch circuit containing a condenser in one branch and an inductance, or a condenser and an inductance, in the other, as measured between the points of attachment to the elevated conductor and earth. The modes of variation with frequency of the reactances in the two cases have been more fully explained by me in Letters Patent No. 767,994 in connection with Figs. 21 and $23^a$ to which reference may be had. Fig. 5 is a curve drawn to rectangular co-ordinates in which the ordinates represent the intensity or amplitude of current and the abscissae represent periodicity.

Figure 1:
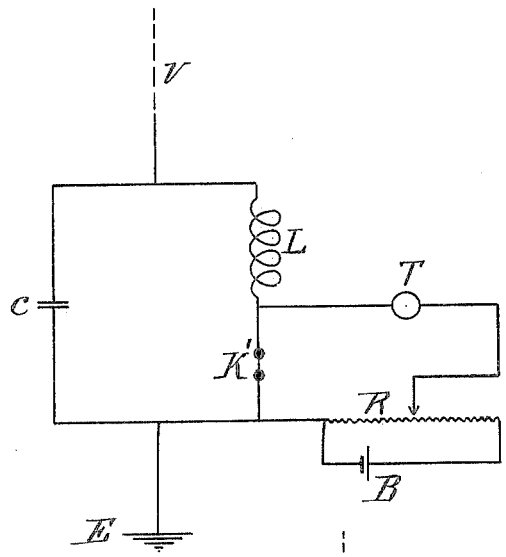
Fig. 1 represents a space telegraph receiving system.

In Figs. 4 and 5, $n'_1$ represents the frequency to which the parallel branch circuit L C of Fig. 1 would be resonant if isolated; $n''_1$ is the fundamental frequency of the elevated conductor *per se* when isolated and $n''_3$ is the first odd harmonic of said fundamental.

In Fig. 27 of Letters Patent No. 767,994 I have represented the more general case in which $n'_1$ and $n''_1$ are not equal numerically, *i. e.*, a case in which the frequencies to which the two circuits respond when isolated are different, while in Fig. 4 of the present specification I have represented for purely illustrative purposes, a case in which $n'_1$ and $n''_1$ are equal, *i. e.*, a case in which the frequencies to which the two circuits respond when isolated are the same.

It will be noted that for at least two frequencies the algebraic sum of the reactances Z and $Z_0$ is zero. Two of these frequencies are represented by $n$ and $n''$ on the axis of abscissae in Fig. 4 and they are the frequencies for which the reactance of the elevated conductor *system* is zero, or for which the reactance of the parallel branch circuit is equal but opposite in sign to that of the elevated conductor *per se.* For the frequency $n$ the reactance of the elevated conductor *per se* is a capacity reactance and the parallel branch circuit is so designed as to present for a persistent train of simple harmonic forces of such frequency an inductance reactance equal to that which would be given by a loading coil adapted to make the fundamental of the elevated conductor *system* of a frequency equal to $n$. Thus if a persistent train of simple harmonic electromagnetic signal waves of frequency $n$ impinge upon the elevated conductor V the reactance offered by the elevated conductor system V L C E to the resulting electrical oscillations will be zero.

The curve represented in Fig. 5 shows the amplitudes of the current developed in the elevated conductor system which correspond to the various frequencies of the impressed force. It will be noted that for the frequency $n$, for which the reactance of the parallel branch circuit is equal and opposite to the reactance of the elevated conductor *per se*, this curve shows a sharply defined maximum while for the frequency $n'_1$ (which is equal to the frequency $n''_1$), to which the parallel branch circuit C L and the elevated conductor *per se* respectively respond when isolated, the amplitude of the current is negligibly small because the system shown in Fig. 1 is a system of two degrees of freedom and therefore neither one of the component circuits of the complex of conductively connected circuits responds to the frequency to which it responded when isolated but, on the contrary, each responds to a different frequency when the system is executing natural vibrations. The frequency $n''$ represents the natural period of the elevated conductor *per se* as affected by its conductive connection with the parallel branch circuit L C and the frequency $n$ represents the natural period of the parallel branch circuit L C as affected by its conductive connection with the elevated conductor *per se.*

Figure 2:
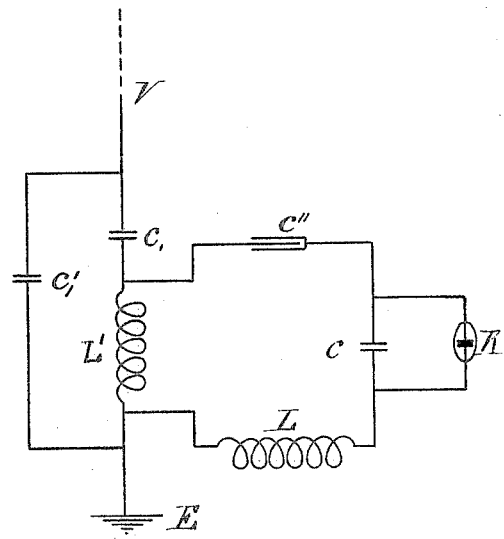
Figure 3:
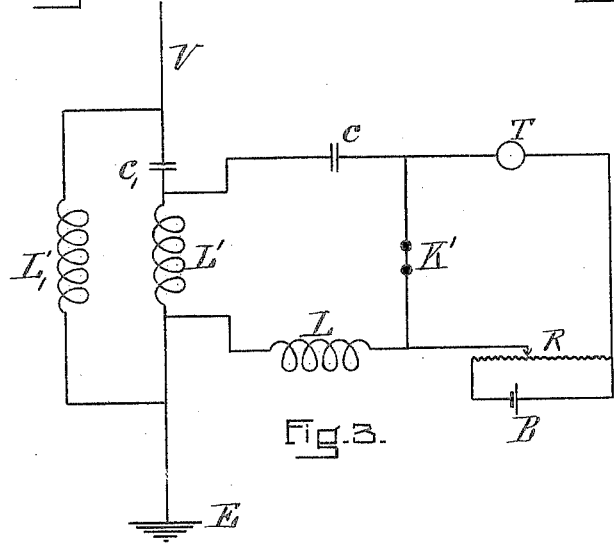

However, as more fully explained in my Letters Patent Nos. 767,971, 767,989 and 767,990, a closed circuit containing capacity and inductance may be made the equivalent of a system having but a single degree of freedom although conductively connected with an elevated receiving conductor, and it will then respond to substantially the same frequency to which it responded when isolated. Such closed resonant receiving circuits are shown in Figs. 2 and 3 in each of which the inductance of the coil L is made large compared to the inductance of the coil L'. Whereas a moderate degree of selectivity may be obtained by means of the systems shown in Fig. 1, electrical impulses of great intensity and of frequencies to which the elevated conductor system is not attuned and, especially, abrupt or impulsive electrical forces impinging upon the elevated conductor will cause the elevated conductor system to vibrate at its natural rates and thus effect the response of the receiver K'. A variety of devices in the nature of induction balances have been proposed for overcoming such defect but these generally involve the employment of a plurality of elevated receiving conductor systems and in them is made no provision whereby the oscillations developed in said elevated receiving conductor systems by extraneous electrical forces shall be equal in amplitude, *form and phase* as is necessary in order to render *nil* the effect of such forces on the receiver, as pointed out in my Letters Patent 716,955, dated December 30, 1902. Therefore in place of one of the aforesaid devices in the nature of induction balances, I prefer to employ the systems shown in Figs. 2 and 3 of the accompanying drawings in which figures L' C'' C L and L' C K' L, respectively, are resonant receiving circuits, each attuned to the frequency of the waves the energy of which is to be received and each made the equivalent of a circuit having but a single degree of freedom by the above mentioned proportionment of their inductances.

In Fig. 2 the condenser $C_1'$ connected in parallel with the condenser $C_1$ and the inductance L' is the means whereby the natural rates of vibration of the elevated conductor system are made different from that of the associated resonant receiving circuit and in Fig. 3 the means for effecting this result is the coil $L_1'$ connected in parallel with the condenser $C_1$ and the inductance L', as more fully explained in my Letters Patent 767,994. Each of the loop circuits $C_1' C_1 L'$ and $L_1' C_1 L'$ is so designed as to present for the frequency of the waves to which the resonant receiving circuit is attuned a capacity or inductance reactance equivalent to that which would be presented, respectively, by a loading condenser or inductance coil adapted to make the fundamental of the elevated conductor system of a frequency equal to that of the waves to be received, in each of which cases the reactance offered by the elevated conductor system to the electrical oscillations developed therein by a persistent train of simple harmonic waves of said frequency will be zero.

When such proportions are given to the constants of the loop or parallel branch circuits, the elevated conductor system in responding to abrupt or impulsive electrical forces has developed therein natural oscillations of frequencies ill adapted to cause a response of the conductively connected resonant circuit because the frequencies of said natural oscillations are different from the frequency to which said resonant circuit is attuned, as more fully explained in Letters Patent No. 767,994.

This application, while not a division of my application Serial No. 193,371, filed February 13, 1904, upon which Letters Patent No. 767,994 issued August 16, 1904, contains claims to those particular embodiments of the broad invention therein disclosed that are illustrated in Figs. 9 and 11 thereof.

Although, as above stated, I have illustrated, for the purpose of explaining the theory of operation of the systems herein disclosed, a case in which the parallel branch circuit and the elevated conductor *per se* each respond to the same frequency when isolated, yet I desire it to be clearly understood that I do not limit myself to such specific construction because, as shown in my Letters Patent Nos. 767,994 and 767,995, the constants of the parallel branch circuit and the elevated conductor *per se* may be so chosen that each circuit when isolated will vibrate at different frequencies.

I claim—

1. In a space telegraph receiving system, an elevated receiving conductor adapted to present a definite reactance for the frequency of the waves the energy of which is to be received; a parallel branch circuit, containing capacity in one branch and inductance in the other, conductively connected with said elevated conductor and so designed as to present for a persistent train of electrical oscillations of said frequency a reactance equal and opposite to that of the elevated conductor per se; and a wave detector conductively associated with one of said branches.

2. In a space telegraph receiving system, an elevated receiving conductor adapted to present a capacity reactance for the frequency of the waves the energy of which is to be received; a parallel branch circuit, containing capacity in one branch and inductance in the other, conductively connected with said elevated conductor and so designed as to present for a persistent train of electrical oscillations of said frequency an inductance reactance equivalent to that which would be given by a loading coil adapted to make the fundamental of the elevated conductor system of a frequency equal to that of the waves to be received; and a wave detector conductively connected to one of said branches.

3. In a space telegraph receiving system, a resonant receiving circuit attuned to the frequency of the waves the energy of which is to be received, and an elevated receiving conductor system conductively connected with said resonant circuit and attuned as to its natural rates of vibration to frequencies different from that of the resonant circuit.

4. In a space telegraph receiving system, a resonant receiving circuit attuned to the frequency of the waves the energy of which is to be received, an elevated receiving conductor conductively connected to said resonant circuit, and means for giving the elevated conductor system natural rates of vibration different from that of the resonant circuit.

5. In a space telegraph receiving system, an elevated receiving conductor, a parallel branch circuit, containing a condenser in one branch and an inductance coil in the other, conductively connected to said elevated conductor, and a resonant receiving circuit, attuned to the frequency of the waves the energy of which is to be received, conductively connected to the terminals of said inductance coil and including a coil of inductance large as compared to the inductance of said first mentioned coil.

6. In a space telegraph receiving system, an elevated receiving conductor adapted to present a definite reactance for the frequency of the waves the energy of which is to be received; a closed circuit, containing capacity and inductance, conductively connected to said elevated conductor and so designed as to balance by its reactance for a persistent train of electrical oscillations of said frequency the reactance of the elevated conductor per se and thereby to render the reactance of the elevated conductor system zero for a persistent train of electrical oscillations of said frequency; and a wave detector included in said closed circuit.

7. In a space telegraph receiving system, a resonant receiving circuit, attuned to the frequency of the waves the energy of which is to be received, an elevated receiving conductor conductively connected to said resonant receiving circuit, and means associated with the elevated receiving conductor system for giving said system natural rates of vibration different from that of the resonant receiving circuit for abrupt or impulsive electrical forces or for electrical impulses of frequencies different from that to which the resonant receiving circuit is attuned and for making it highly responsive to a persistent train of waves of the frequency of the waves the energy of which is to be received.

8. In a space telegraph receiving system, an elevated receiving conductor system comprising an elevated receiving conductor and a parallel branch circuit conductively connected thereto, said circuit containing capacity and inductance in its branches and having such reactance for the frequency of the waves the energy of which is to be received as to balance the reactance of the elevated conductor per se for such frequency, and an oscillation detector conductively connected with said parallel branch circuit.

9. In a space telegraph receiving system, an elevated receiving conductor system comprising an elevated receiving conductor conductively connected with a parallel branch circuit having a condenser connected in one branch and an inductance connected in the other branch, the said circuit having such reactance for the frequency of the waves the energy of which is to be received as to balance the reactance of the elevated conductor per se, and a resonant receiving circuit, attuned to the frequency of the waves the energy of which is to be received, conductively connected with said parallel branch circuit.

10. In a space telegraph receiving system, an elevated receiving conductor system having natural rates of vibration different from the frequency of the waves the energy of which is to be received, and a resonant receiving circuit, attuned to the frequency of the waves the energy of which is to be received, conductively connected with said elevated conductor system.

11. In a space telegraph receiving system, an elevated receiving conductor system having natural rates of vibration different from the frequency of the waves the energy of which is to be received, a resonant receiving circuit, attuned to the frequency of the waves the energy of which is to be received and conductively connected with said elevated conductor system, and means for rendering the resonant receiving circuit the equivalent of a circuit having a single degree of freedom.

12. In a space telegraph receiving system, an elevated receiving conductor system comprising an elevated receiving conductor conductively connected with a parallel branch circuit adapted, for the frequency of the waves the energy of which is to be received, to balance the reactance of the elevated conductor per se for said frequency, and a resonant receiving circuit, attuned to the frequency of the waves the energy of which is to be received and conductively connected with said parallel branch circuit.

13. In a space telegraph receiving system, an elevated receiving conductor system comprising an elevated receiving conductor conductively connected with a parallel branch circuit having a condenser connected in one branch and an inductance connected in the other branch, and a resonant receiving circuit, attuned to the frequency of the waves the energy of which is to be received and conductively connected to said inductance.

14. In a space telegraph receiving system, an elevated receiving conductor system comprising an elevated receiving conductor conductively connected with a parallel branch circuit having a condenser connected in one branch and an inductance connected in the other branch, a resonant receiving circuit, attuned to the frequency of the waves the energy of which is to be received and conductively connected to said inductance, and an inductance connected in said resonant receiving circuit large as compared to the portion of the first mentioned inductance included in the resonant circuit.

15. In a space telegraph receiving system, an elevated receiving conductor system comprising an elevated receiving conductor conductively connected with a parallel branch circuit having a condenser in one branch and an inductance in the other, a resonant receiving circuit, attuned to the frequency of the waves the energy of which is to be received, conductively connected to one of the elements of said parallel branch circuit, and means whereby the mutual energy of the resonant circuit with the elevated conductor system is made small compared to the self energy of said resonant circuit.

In testimony whereof I have hereunto subscribed my name this 29th day of March, 1905.

JOHN STONE STONE.

Witnesses:
WILLIAM COBB,
BRAINERD T. JUDKINS.